(12) United States Patent
Kang et al.

(10) Patent No.: US 11,314,483 B2
(45) Date of Patent: Apr. 26, 2022

(54) BIT-SERIAL COMPUTATION WITH DYNAMIC FREQUENCY MODULATION FOR ERROR RESILIENCY IN NEURAL NETWORK

(71) Applicant: INTERNATIONAL BUSINESS MACHINES CORPORATION, Armonk, NY (US)

(72) Inventors: Mingu Kang, Old Tappan, NJ (US); Seyoung Kim, White Plains, NY (US); Kyu-hyoun Kim, Watervliet, NY (US); Eun Kyung Lee, Bedford Corners, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 360 days.

(21) Appl. No.: 16/737,440

(22) Filed: Jan. 8, 2020

(65) Prior Publication Data
US 2021/0208847 A1 Jul. 8, 2021

(51) Int. Cl.
*G06F 7/523* (2006.01)
*G06N 3/08* (2006.01)
*G06F 7/50* (2006.01)

(52) U.S. Cl.
CPC ............. *G06F 7/523* (2013.01); *G06F 7/50* (2013.01); *G06N 3/08* (2013.01)

(58) Field of Classification Search
CPC ........... G06F 7/48–575; G06F 11/0757; G06F 11/3419; G06F 11/3442; G06N 3/06; G06N 3/063; G06N 3/08
See application file for complete search history.

(56) References Cited

U.S. PATENT DOCUMENTS 8,316,249 B2   11/2012  Palem et al.
8,639,975 B2    1/2014  Whatmough et al.
(Continued)

FOREIGN PATENT DOCUMENTS

EP          0 430 449 A2   6/1991

OTHER PUBLICATIONS

Amirtharajah et al., "A Micropower Programmable DSP Using Approximate Signal Processing Based on Distributed Arithmetic", IEEE Journal of Solid-State Circuits, Feb. 2004, pp. 337-347 vol. 39, No. 2.
(Continued)

*Primary Examiner* — Emily E Larocque
(74) *Attorney, Agent, or Firm* — Tutunjian & Bitetto PC; Randall Bluestone

(57) ABSTRACT

A system is provided for error resiliency in a bit serial computation. A delay monitor enforces an overall processing duration threshold for bit-serial processing all iterations for the bit serial computation, while determining a threshold for processing each iteration. At least some iterations correspond to a respective bit in an input bit sequence. A clock generator generates a clock signal for controlling a performance of the iterations. Each of iteration units perform a particular iteration, starting with a Most Significant Bit (MSB) of the input bit sequence and continuing in descending bit significant order, and by selectively increasing the threshold for at least one iteration while skipping from processing at least one subsequent iteration whose iteration-level processing duration exceeds a remaining amount of an overall processing duration for all iterations, responsive to the at least one iteration requiring more time to complete than a current value of the threshold.

20 Claims, 7 Drawing Sheets

(56) References Cited

U.S. PATENT DOCUMENTS

| | | | |
|---|---|---|---|
| 2002/0103841 A1* | 8/2002 | Parviainen | G06F 9/3001 |
| | | | 708/620 |
| 2017/0286117 A1 | 10/2017 | Mohapatra et al. | |
| 2017/0300372 A1 | 10/2017 | Andreopoulos et al. | |
| 2017/0357891 A1* | 12/2017 | Judd | G06N 3/063 |
| 2018/0113678 A1* | 4/2018 | Sadowski | G06F 7/4824 |
| 2018/0322607 A1* | 11/2018 | Mellempudi | G06F 17/16 |
| 2019/0042244 A1 | 2/2019 | Henry et al. | |
| 2019/0103149 A1 | 4/2019 | Hasbun et al. | |
| 2019/0377707 A1* | 12/2019 | Giefers | G06F 15/8046 |

OTHER PUBLICATIONS

Gupta et al., "Understanding Voltage Variations in Chip Multiprocessors using a Distributed Power-Delivery Network", 2007 Design, Automation & Test in Europe Conference & Exhibition, May 2007, 6 pages.

White, Stanley A., "Applications of Arithmetic to Digital Signal Processing: A Tutorial Review", IEEE ASSP Magazine, Jul. 1989, pp. 1-16.

* cited by examiner

BIT-SERIAL COMPUTATION WITH DYNAMIC FREQUENCY MODULATION FOR ERROR RESILIENCY IN NEURAL NETWORK

BACKGROUND

The present invention generally relates to artificial intelligence, and more particularly to a bit-serial computation with dynamic frequency modulation for error resiliency in a neural network. Conventional Dynamic Voltage Frequency Modulation (DVFM) techniques can be employed to guarantee the correctness of computation under supply noise by providing enough supply voltage or lowering frequency, causing significant penalties in energy and delay efficiency. Thus, there is a need for an improved dynamic frequency modulation technique.

SUMMARY

According to an aspect of the present invention, a computation system is provided that, in turn, provides error resiliency in a bit serial computation. The computation system includes a delay monitor configured to enforce an overall processing duration threshold for bit-serial processing all of a plurality of iterations for the bit serial computation, while dynamically determining a dynamically variable iteration-level processing duration threshold for processing each of the plurality of iterations. At least some of the plurality of iterations correspond to a respective bit in an input bit sequence. The computation system further includes a clock generator, operatively coupled to the delay monitor, configured to generate a clock signal for controlling a performance of the plurality of iterations. The computation system also includes a plurality of iteration units. Each of the plurality of iteration units is operatively coupled to the clock generator and configured to perform a particular one of the plurality of iterations, starting with a Most Significant Bit (MSB) of the input bit sequence and continuing in descending bit significant order, and by selectively increasing the dynamically variable iteration-level processing duration threshold for at least one of the plurality of iterations while skipping from processing at least one subsequent one of the plurality of iterations whose iteration-level processing duration exceeds a remaining amount of an overall processing duration for all of the plurality of iterations, responsive to the at least one of the plurality of iterations requiring more time to complete than a current value of the dynamically variable iteration-level processing duration threshold.

According to another aspect of the present invention, a method is provided for performing providing error resiliency in a bit-serial computation. The method includes enforcing, by a delay monitor, an overall processing duration threshold for bit-serial processing all of a plurality of iterations for the bit serial computation while dynamically determining a dynamically variable iteration-level processing duration threshold for processing each of the plurality of iterations. At least some of the plurality of iterations correspond to a respective bit in an input bit sequence. The method further includes generating, by a clock generator operatively coupled to the delay monitor, a clock signal for controlling a performance of the plurality of iterations. The method also includes performing, by each of a plurality of iteration units operatively coupled to the clock generator, a particular one of the plurality of iterations, starting with a Most Significant Bit (MSB) of the input bit sequence and continuing in descending bit significant order, and by selectively increasing the dynamically variable iteration-level processing duration threshold for at least one of the plurality of iterations while skipping from processing at least one subsequent one of the plurality of iterations whose iteration-level processing duration exceeds a remaining amount of an overall processing duration for all of the plurality of iterations, responsive to the at least one of the plurality of iterations requiring more time to complete than a current value of the dynamically variable iteration-level processing duration threshold.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention are directed to bit-serial computation with dynamic frequency modulation for providing error resiliency in a neural network. In an embodiment, the bi-serial computation is a dot product computation. However, the present invention can be applied to other computations, given the teachings of the present invention provided herein. Types of neural networks to which embodiments of the present invention can be applied include, but are not limited to, Resnet, Alexnet, LSTM, Googlenet, Mobilenet, etc. Basically, any neural network that performs a dot product computation can utilize aspects of the present invention.

Embodiments of the present invention provide power and speed benefits over conventional approaches when noise sources are present (e.g., temperature variation, chip-to-chip variation, power fluctuation, etc.). For example, embodiments of the present invention can drastically reduce the margin of supply voltage (e.g., 1V→0.8 V) or frequency by avoiding the voltage guard band (0.2V) and thus providing energy and delay savings. Moreover, embodiments of the present invention can better deal with errors that can result from noise. For example, even under very aggressive power or temperature noise sources, embodiments of the present invention compute the important information (Most Significant Bit) first, thus ensuring preservation of the same under a potential energy savings over the prior art.

Figure 1:
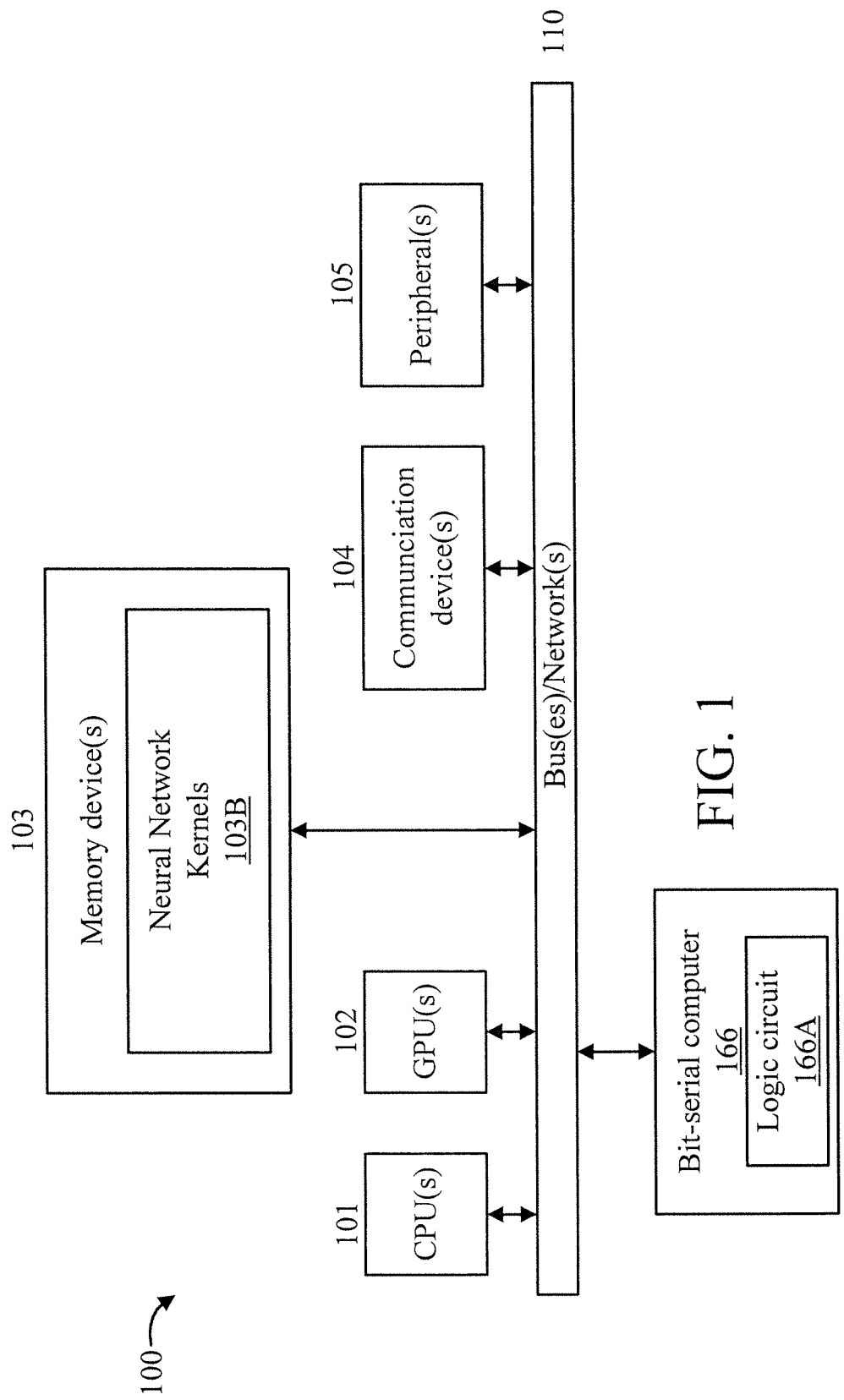
FIG. 1 is a block diagram showing an exemplary processing system, in accordance with an embodiment of the present invention.

FIG. 1 is a block diagram showing an exemplary processing system 100, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

In an embodiment, memory devices 103 can store specially programmed software modules to transform the computer processing system into a special purpose computer configured to implement various aspects of the present invention. In an embodiment, special purpose hardware (e.g., Application Specific Integrated Circuits, Field Programmable Gate Arrays (FPGAs), and so forth) can be used to implement various aspects of the present invention. The memory device 103 includes trained neural network kernels 103B.

Processing system 100 further includes a bit-serial computer 166 with dynamic frequency modulation for providing error resiliency in the inference computation of a neural network. Neural network inference (classification) computation is composed of many $\vec{X}\vec{W}$s, where $\vec{X}$ is an activation (input to the system) and $\vec{W}$ is a kernel, which is obtained from training. Thus, $\vec{X}$ is a variable input to the hardware system, but $\vec{W}$ can be stored in 103B before it is used for inference (classification) computation. In addition, the inference computation itself is performed in block 166 whereas 103B simply stores the kernels needed for the computation. Thus, the error resiliency is achieved in block 166. In an embodiment, the bit-serial computer 166 includes a logic circuit 166A.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

Figure 2:
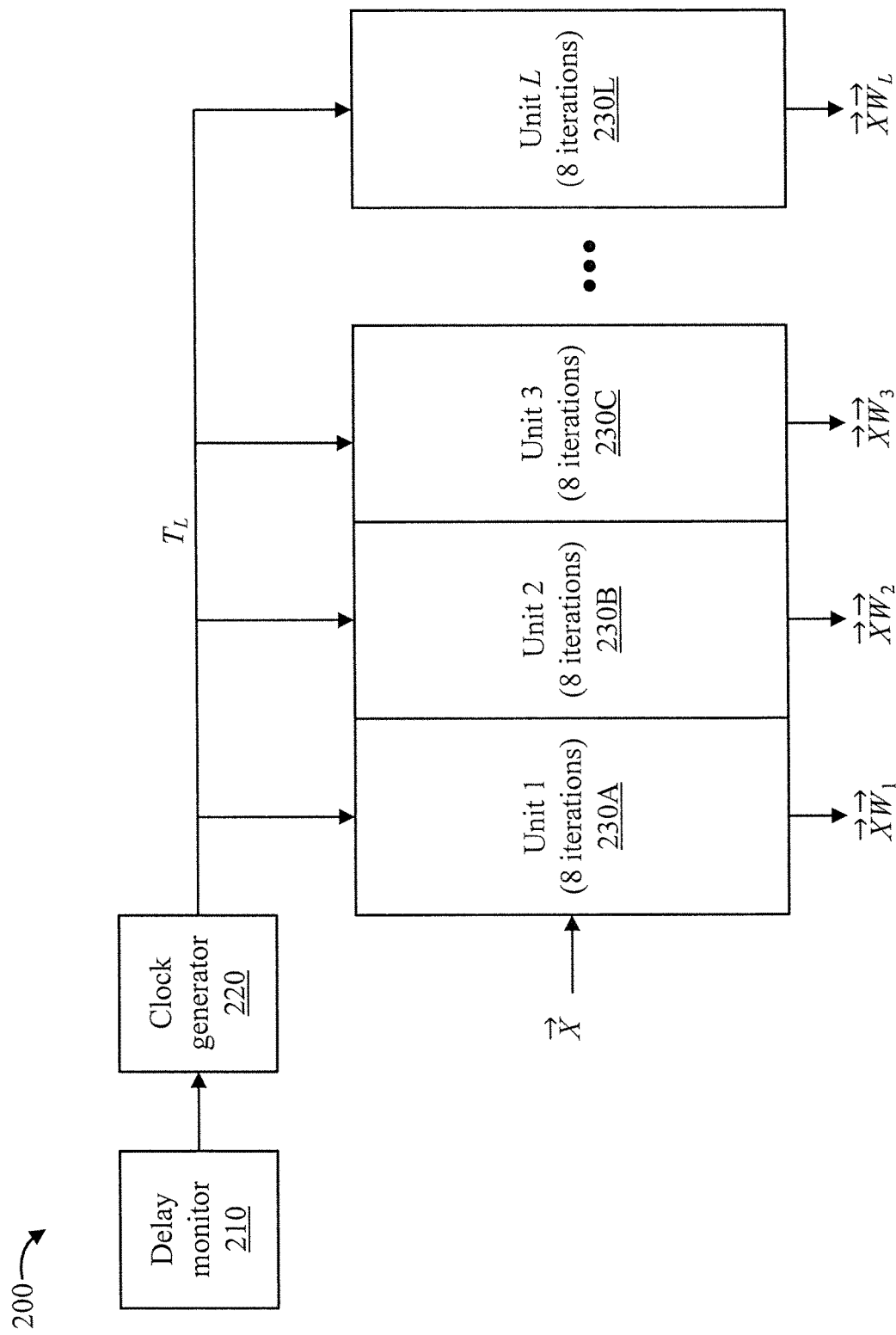
FIG. 2 is a block diagram showing an exemplary bit-serial computation computer with dynamic frequency modulation for error resiliency in a neural network, in accordance with an embodiment of the present invention.
Figure 3:
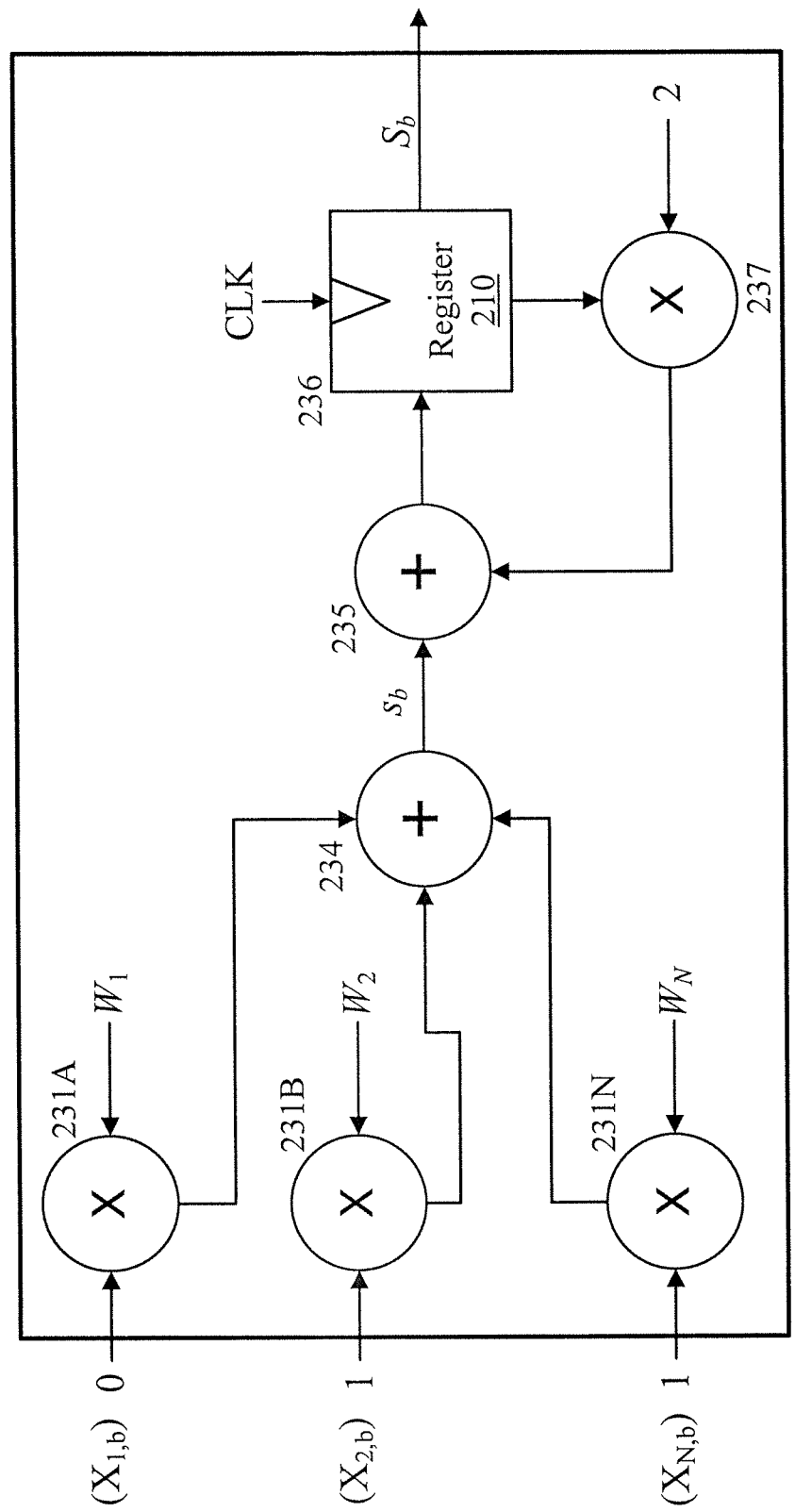
FIG. 3 shows an exemplary iteration unit included in the bit serial computer of FIG. 2, in accordance with an embodiment of the present invention.

FIG. 2 is a block diagram showing an exemplary bit-serial computation computer 200 with dynamic frequency modulation for error resiliency in a neural network, in accordance with an embodiment of the present invention. FIG. 3 shows an exemplary iteration unit 230 included in the bit serial computer 200 of FIG. 2, in accordance with an embodiment of the present invention.

Referring to FIGS. 2 and 3, the computer 200 includes a delay monitor 210, a clock generator 220, and a set of iteration units 230 (formed of iteration units 230A-230L). The set of iteration units perform 8 (B=8) iterations, each corresponding to a respective one of eight bit positions.

The clock generator 220 is operatively coupled to the delay monitor 210 and the set of iteration units 230. Each of the iteration units 230 receives an input $\vec{X}$, and outputs $\vec{X}\vec{W}_i$, where $\vec{X}=[X_1, X_2, \ldots, X_N]$, $\vec{W}=[W_1, W_2, \ldots, W_N]$, and $\vec{X} \cdot \hat{W} = X_1 W_1, X_2 W_2, \ldots, X_N W_N$.

Computation $\vec{X} \cdot \vec{W}$ is processed in a bit-serial fashion, e.g., $\vec{X}$'s elements' 0 bit position ($X_{n0}$ where n=1, 2, ..., N)) is processed at the first cycle (cycle 1), the 1 bit position ($X_{n1}$) is processed at the second cycle (cycle 2), and so on until the (B−1)-th bit position ($X_{n(B-1)}$) is processed at the B-th cycle (cycle B). However, processing starts by taking the MSB first and proceeding in descending order, and not the LSB and proceeding in ascending order for the reasons mentioned herein. Hence, in an embodiment, the present invention is performed in a task lacking redundant computations.

Each iteration unit 230 includes a multipliers 231A-N, an adder tree 234, an adder 235, a register 236, and a multiplier 237. In an embodiment, each iteration unit includes and/or is otherwise implemented by a logic circuit. The multiplier 231A multiplies a first input element's b-th bit ($X_{1b}$) by $W_1$ at (b+1)-th cycle. The multiplier 232B multiplies a second input bit by $W_2$ at (b+1)-th cycle. The multiplier 233N multiplies a N-th input element's b-th bit by $W_N$ at (b+1)-th cycle.

The adder tree 234 adds the outputs of the multipliers 231A-N to output $s_b$.

The multiplier 237 multiplies a fourth input bit 2 and an output of the register 236 to represent bit position, e.g., $s_3=2^3 s_3+2^2 s_2+2s_1+s_0=s_0+2(s_1+2(s_2+2s_3))$.

The adder 235 adds $s_b$ and the output of the multiplier 237.

The register 236 is responsive to a clock signal CLK provided by the clock generator 220 and outputs $S_b$. (i.e., the result of $\vec{X}\vec{W}$] at the end of B such cycles).

Figure 4:
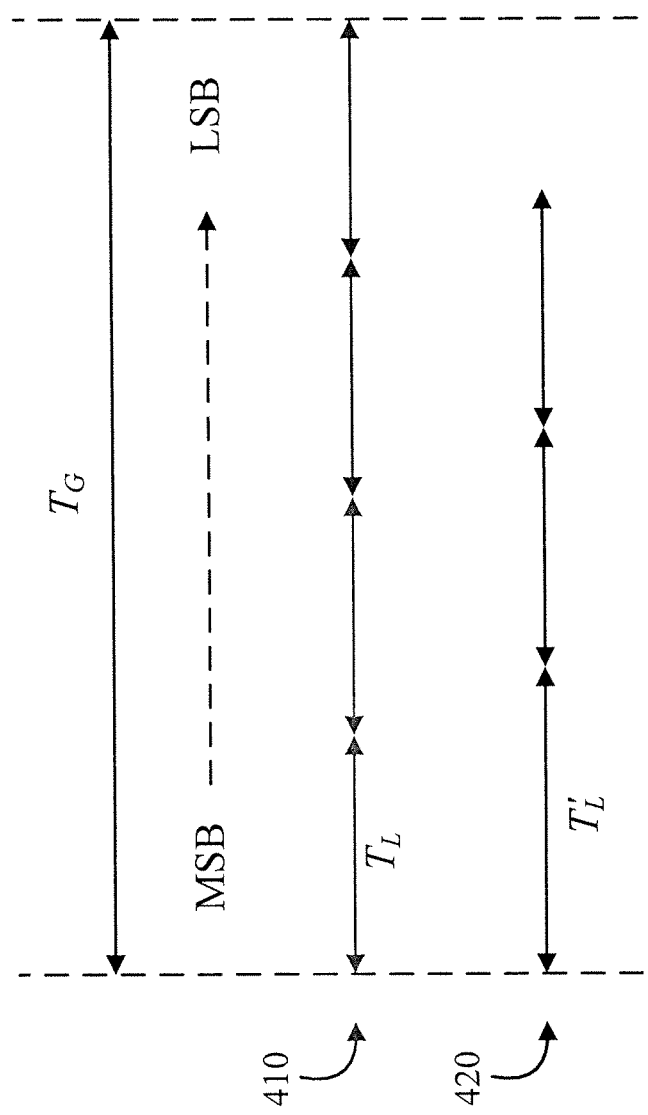
FIG. 4 is a timing diagram showing a bit-serial modulation technique and a dynamic frequency modulation technique, in accordance with an embodiment of the present invention.

FIG. 4 is a timing diagram showing a bit-serial modulation technique 410 and a dynamic frequency modulation technique 420, in accordance with an embodiment of the present invention.

With respect to the timing, the following applies:
1. Setup $T_L$ and $T_G$ without excessive margin (e.g., $T_L$ is 5% larger than the worst-case delay of block 230 to barely avoid a timing error), where $T_L$ is a delay to compute single bit whereas $T_G$ is a delay for the entire B-bit processing, i.e., $T_G=B \cdot T_L$ at default setup, where B is the number of bits of the input bit sequence $\vec{X}$.
2. Equip on-chip delay monitor circuitry to decide the proper $T_L$ dynamically to obtain $T'_L$. For example, $T'_L$ is decided to ensure at least the MSB is processed, but preferably more bits than just the MSB while hopefully avoiding dropping, e.g., one or no more than one, lower significance bit(s).
3. On the other hand, $T_G$ is set to a fixed amount of time to guarantee the real-time application requirements (e.g., total processing time of the bit-serial computation).
4. If $T_L$ becomes large due to many noise sources, compute as many bits as possible within the delay of $T_G$ from MSB first, but give up the LSB bits if needed.

In this way, the system does not break down drastically when the delay is increased due to the noise, but the accuracy will be gracefully degraded by quantization noise rather than timing error.

For example, consider the case where B=4 as shown in FIG. 4. T'L can be modified to ensure the MSB can be processed, then T'L can be modified again to ensure the 2nd MSB can be processed, and so forth, and these modifications may result in not enough remaining to complete, e.g., the LSB and possible the second LSB. However, it is to be appreciated that the most important information (MSB(s)) are assuredly being processed while dropping the least important information (LSB(s)).

Figure 5:
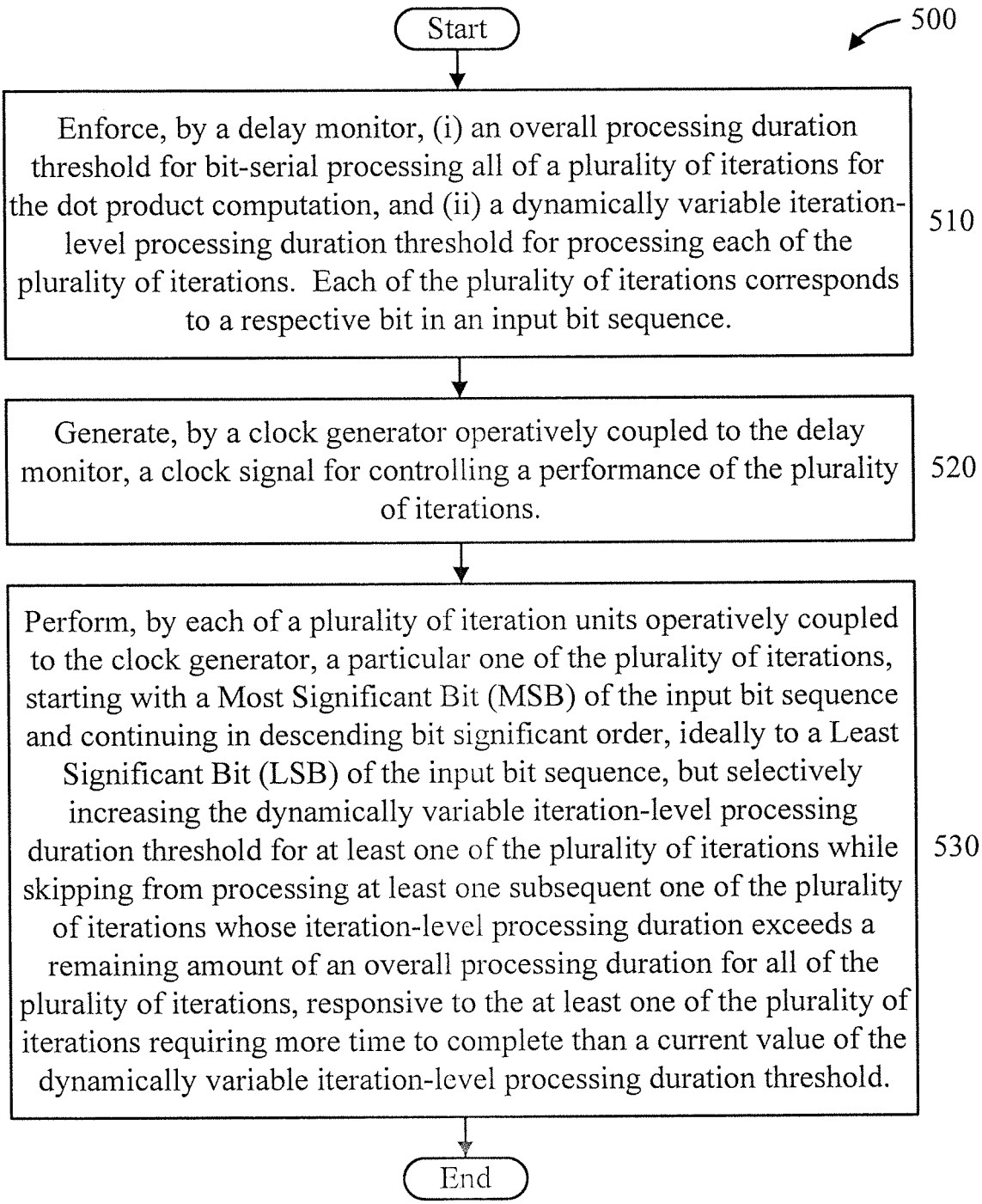
FIG. 5 is a flow diagram showing a method for providing error resiliency in a bit-serial computation, in accordance with an embodiment of the present invention.

FIG. 5 is a flow diagram showing a method 500 for providing error resiliency in a bit-serial (e.g., a dot product) computation, in accordance with an embodiment of the present invention.

At block 510, enforce, by a delay monitor, an overall processing duration threshold for bit-serial processing all of a plurality of iterations for the dot product computation, while dynamically determining a dynamically variable iteration-level processing duration threshold for processing each of the plurality of iterations. At least some of the plurality of iterations correspond to a respective bit in an input bit sequence. It is "at least some" because some iterations may be dropped from being performed, as described below, thus saving calculations performed with respect thereto.

At block 520, generate, by a clock generator operatively coupled to the delay monitor, a clock signal for controlling a performance of the plurality of iterations.

At block 530, perform, by each of a plurality of iteration units operatively coupled to the clock generator, a particular one of the plurality of iterations, starting with a Most Significant Bit (MSB) of the input bit sequence and continuing in descending bit significant order, ideally to a Least Significant Bit (LSB) of the input bit sequence, but selectively increasing the dynamically variable iteration-level processing duration threshold for at least one of the plurality of iterations while skipping from processing at least one subsequent one of the plurality of iterations whose iteration-level processing duration exceeds a remaining amount of an overall processing duration for all of the plurality of iterations, responsive to the at least one of the plurality of iterations requiring more time to complete than a current value of the dynamically variable iteration-level processing duration threshold.

Figure 6:
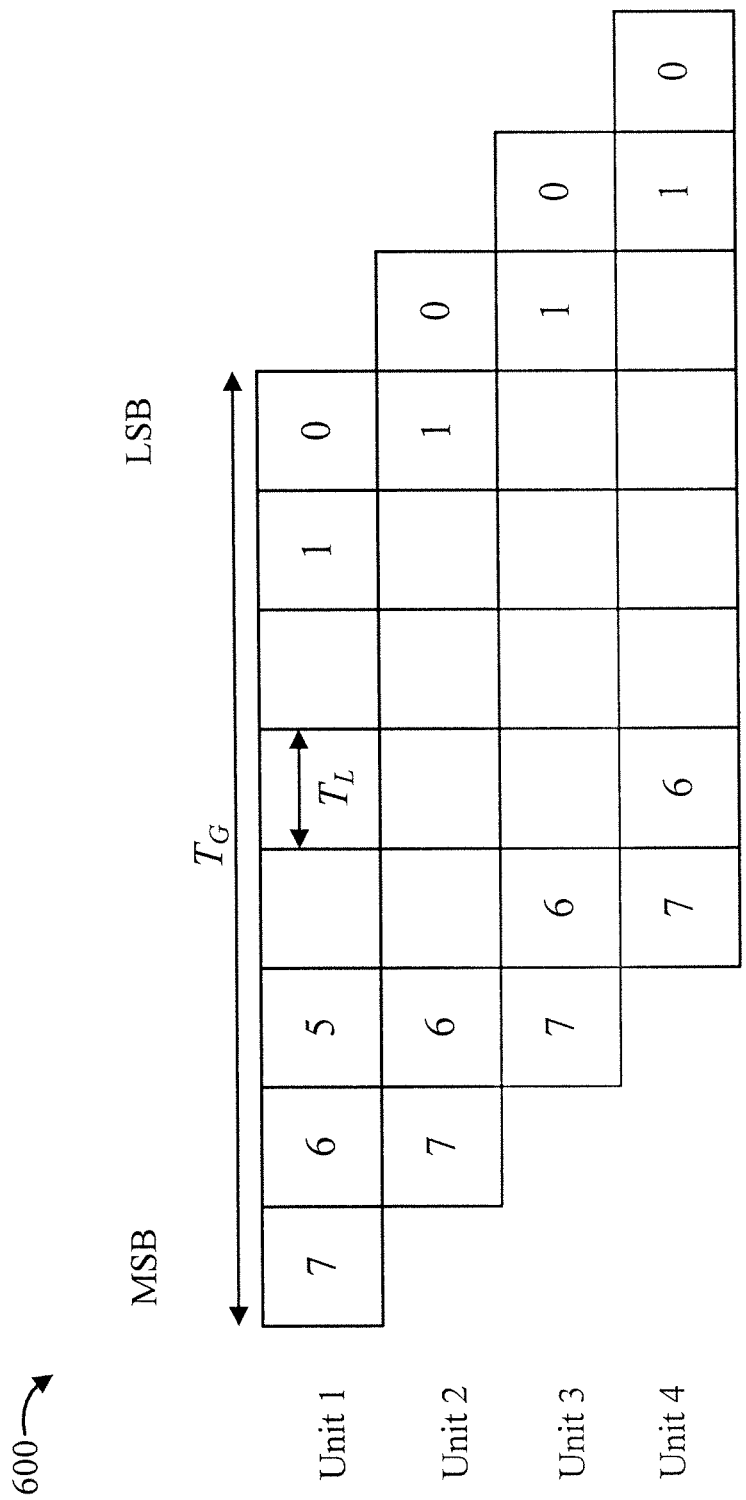
FIG. 6 is a block diagram showing an exemplary bit-serial processing under normal conditions, in accordance with an embodiment of the present invention.

FIG. 6 is a block diagram showing an exemplary bit-serial processing 600 under normal conditions, in accordance with an embodiment of the present invention.

Figure 7:
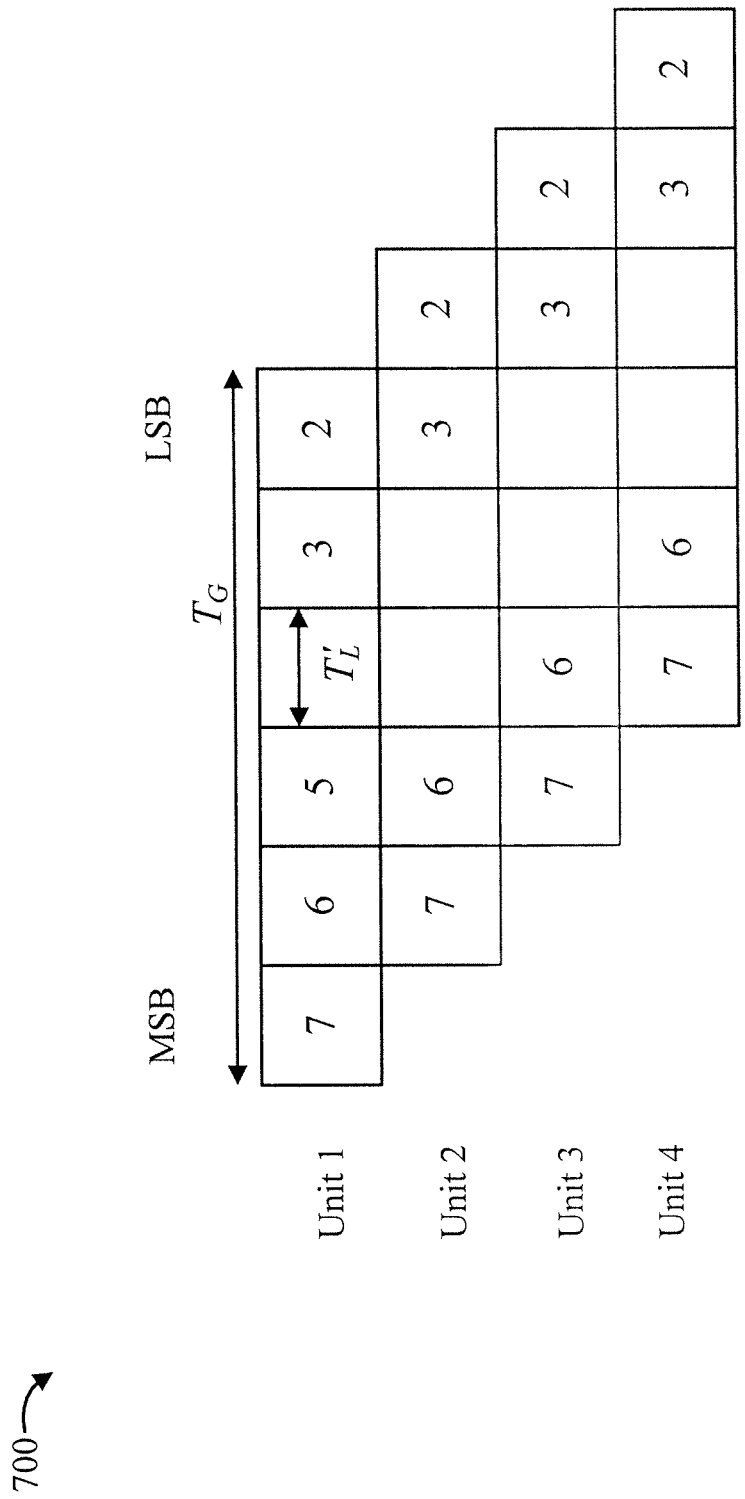
FIG. 7 is a block diagram showing an exemplary bit-serial processing under noisy conditions, in accordance with an embodiment of the present invention.

FIG. 7 is a block diagram showing an exemplary bit-serial processing 700 under noisy conditions, in accordance with an embodiment of the present invention.

As can be seen when comparing FIG. 6 to FIG. 7, under normal conditions (FIG. 6) all bits are serially processed (see also FIG. 4), while under noisy conditions (FIG. 7) some of the least significant bits are not processed (dropped) while preserving the most important information (i.e., the MSB(s)) (see also FIG. 5).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computation system for providing error resiliency in a bit serial computation, comprising:

a delay monitor configured to enforce an overall processing duration threshold for bit-serial processing all of a plurality of iterations for the bit serial computation, while dynamically determining a dynamically variable iteration-level processing duration threshold for processing each of the plurality of iterations, at least some of the plurality of iterations corresponding to a respective bit in an input bit sequence;

a clock generator, operatively coupled to the delay monitor, configured to generate a clock signal for controlling a performance of the plurality of iterations; and a plurality of iteration units, each operatively coupled to the clock generator and configured to perform a particular one of the plurality of iterations, starting with a Most Significant Bit (MSB) of the input bit sequence and continuing in descending bit significant order, and by selectively increasing the dynamically variable iteration-level processing duration threshold for at least one of the plurality of iterations while skipping from processing at least one subsequent one of the plurality of iterations whose iteration-level processing duration exceeds a remaining amount of an overall processing duration for all of the plurality of iterations, responsive to the at least one of the plurality of iterations requiring more time to complete than a current value of the dynamically variable iteration-level processing duration threshold.

2. The computation system of claim 1, wherein the bit-serial computation is a dot product computation.

3. The computation system of claim 1, wherein the at least one other one of the plurality of iteration is skipped responsive to processing under noisy conditions.

4. The computation system of claim 1, wherein each of the plurality of iteration units comprises a register.

5. The computation system of claim 1, wherein each of the plurality of iteration units comprises an adder tree.

6. The computation system of claim 1, wherein each of the plurality of iteration units comprises a set of input multipliers, each for receiving a respective bit of the input bit sequence.

7. The computation system of claim 1, wherein the set of input multipliers multiply the bit from an input weight sequence by a respective kernel weight involved in the dot product computation.

8. The computation system of claim 1, wherein the overall processing duration threshold is kept fixed under all operating conditions.

9. The computation system of claim 1, wherein the plurality of iteration units comprises more units than elements of an input vector, such that a subset of the plurality of iteration units are used, the subset having a number of members equal to a number of elements of the input vector.

10. The computation system of claim 1, wherein the dot product computation is performed for a neural network.

11. The computation system of claim 1, wherein as a default setup prior to any adjustment of the dynamically variable iteration-level processing duration threshold, the overall processing duration threshold is equal to the dot product of B and the dynamically variable iteration-level processing duration threshold, wherein B is an integer representing a number of input bits of the input bit sequence.

12. A method for performing providing error resiliency in a bit-serial computation, comprising:

enforcing, by a delay monitor, an overall processing duration threshold for bit-serial processing all of a plurality of iterations for the bit serial computation while dynamically determining a dynamically variable iteration-level processing duration threshold for processing each of the plurality of iterations, at least some of the plurality of iterations corresponding to a respective bit in an input bit sequence;

generating, by a clock generator operatively coupled to the delay monitor, a clock signal for controlling a performance of the plurality of iterations; and performing, by each of a plurality of iteration units operatively coupled to the clock generator, a particular one of the plurality of iterations, starting with a Most Significant Bit (MSB) of the input bit sequence and continuing in descending bit significant order, and by selectively increasing the dynamically variable iteration-level processing duration threshold for at least one of the plurality of iterations while skipping from processing at least one subsequent one of the plurality of iterations whose iteration-level processing duration exceeds a remaining amount of an overall processing duration for all of the plurality of iterations, responsive to the at least one of the plurality of iterations requiring more time to complete than a current value of the dynamically variable iteration-level processing duration threshold.

13. The method of claim 12, wherein the bit-serial computation is a dot product computation.

14. The method of claim 12, wherein the at least one other one of the plurality of iteration is skipped responsive to processing under noisy conditions.

15. The method of claim 12, wherein each of the plurality of iteration units comprises a register.

16. The method of claim 12, wherein each of the plurality of iteration units comprises an adder tree.

17. The method of claim 12, wherein each of the plurality of iteration units comprises a set of input multipliers, each for receiving a respective bit of the input bit sequence.

18. The method of claim 12, wherein the set of input multipliers multiply the bit from an input weight sequence by a respective kernel weight involved in the dot product computation.

19. The method of claim 12, wherein the overall processing duration threshold is kept fixed under all operating conditions.

20. The method of claim 12, wherein the plurality of iteration units comprises more units than elements of an input vector, such that a subset of the plurality of iteration units are used, the subset having a number of members equal to a number of elements of the input vector.

* * * * *